United States Patent [19]
Cave

[11] 3,784,158
[45] Jan. 8, 1974

[54] FLUID-FLOW CONTROL VALVES AND SEALING MEANS THEREFOR

[75] Inventor: Gordon Milford Cave, Solihull, England

[73] Assignee: Coplastix Limited, Redditch, Worcestershire, England

[22] Filed: May 1, 1972

[21] Appl. No.: 248,987

[52] U.S. Cl............... 251/327, 251/333, 61/22 A, 251/147
[51] Int. Cl............................................. F16k 3/12
[58] Field of Search................ 49/440; 61/22 A; 251/327, 328, 333, 147

[56] References Cited
UNITED STATES PATENTS

| | | | |
|---|---|---|---|
| 3,537,681 | 11/1970 | Wrenshall | 251/327 X |
| 3,333,814 | 8/1967 | Sargent | 251/328 X |
| 2,194,261 | 3/1940 | Allen | 251/328 |
| 3,367,625 | 2/1968 | Fortune | 251/328 X |
| 2,893,684 | 7/1959 | Williams | 251/328 |
| 2,969,218 | 1/1961 | Shaw | 251/333 |

Primary Examiner—Harold W. Weakley
Attorney—James E. Nolan et al.

[57] ABSTRACT

A valve of the type comprising a sliding closure member slidable across an opening to control flow of fluid through the opening and including a frame, a closure member slidable in the frame between an open condition and a closed condition, and a sealing member so disposed and arranged as to be compressed when the closure member is in the closed condition between adjacent surface portions of the frame and the closure member respectively to effect a seal between the frame and the closure member, the sealing member comprising a portion of resilient material bonded to one of said surface portions and a bearing portion bonded to said resilient portion and bearing on said other surface portion and having a low coefficient of friction with respect of said resilient portion and said other surface portion, said bearing portion being arranged to slide on said other surface portion as the closure member is moved between its closed and open conditions in the operation of the valve.

13 Claims, 2 Drawing Figures

FLUID-FLOW CONTROL VALVES AND SEALING MEANS THEREFOR

This invention is concerned with improvements in or relating to fluid-flow control valves and sealing means therefor and is especially concerned with valves of the type comprising a sliding closure member slidable across an opening to control flow of fluid through the opening. The phrase "valve of the type referred to" where used herein is to be understood as denoting a valve of the aforesaid type.

One form of valve of the type referred to in common use comprises a frame in which the opening is provided, the closure member being slidable in the frame across the opening. Examples of such valves of the type referred to in common use are those often referred to as penstocks or sluice gates having closure members slidable up and down across an opening; these are frequently large valves used to control flow of water from reservoirs or the flow of effluent in sewage treatment plant, for example.

Sluice gates and penstocks have been used in large numbers and have been found to be generally satisfactory. However, in certain circumstances, they have disadvantages one of which is that by reason of the simplicity of the closure it has not hitherto been possible readily and economically to provide a sufficiently leak proof seal. Many attempts have been made to improve the seal but so far these attempts have not proved altogether satisfactory. While it has proved possible to provide a leak proof seal at considerable expense it has proved difficult to provide cheaply an efficient seal which has a sufficiently long life. Attempts have been made to improve the sealing by the provision, between the sliding faces of the gate member and the frame, of a sealing member secured to the gate member or the frame and extending down side portions and across bottom portions of the opening (where the fluid is to flow along an open-top channel rather than a pipe); however the sealing members of such valves have frequently been found to wear away quickly, being heavily abraded during opening and closing of the valve, to be too expensive for the application for which they are required, or to have some other disadvantage.

An object of the present invention is to provide an improved valve of the type referred to.

According to the present invention there is provided a valve of the type referred to comprising a frame, a closure member slidable in the frame between an open condition and a closed condition, and a sealing member so disposed and arranged as to be compressed when the closure member is in the closed condition between adjacent surface portions of the frame and the closure member respectively to effect a seal between the frame and the closure member, the sealing member comprising a portion of resilient material bonded to one of said surface portions and a bearing portion bonded to said resilient portion and bearing on said other surface portion and having a lower coefficient of friction than said resilient portion, with respect to said other surface portion, said bearing portion being arranged to slide on said other surface portion as the closure member is moved between its closed and open conditions in the operation of the valve.

Preferably there are two such sealing members disposed at opposite sides of the closure member such that when the latter is in the closed condition each sealing member is compressed between a surface portion of the closure member and a surface portion of the frame to effect a seal therebetween.

Preferably the or each sealing member is secured to the frame; however, the sealing member may if desired be secured to the closure member of the valve.

Also the valve may have only one sealing member disposed at one side only of the closure member. In such a case the valve is preferably placed in a flow channel with the sealing member disposed at the opposite side of the closure member to that from which fluid will normally flow when the valve is in an open condition so that hydrostatic pressure will assist sealing.

The bearing portion of the or each sealing member and the surface portion on which it bears are preferably selected so that they are wear-resistant, for example against abrasion by grit or other foreign matter trapped therebetween.

The or each sealing member preferably has the resilient portion and the bearing portion of about equal thickness, suitably, where the closure member is about two inches thick, about one-fourth inch. The resilience of the resilient portion and the flexibility of the bearing portion are selected so that the bearing portion is urged into acceptable sealing contact with the surface portion on which it is to bear in use. Preferably the bearing portion is thick enough to be chamfered, but excessive thickness is preferably avoided because of expense and to avoid undue reduction of flexibility.

The above and other of the various objects and several features of the invention will become further apparent from the following description with reference to the accompanying drawings which illustrate a valve made in accordance with the invention. It will be realised that the description and drawings are by way of example and not of limitation.

Figure 1:
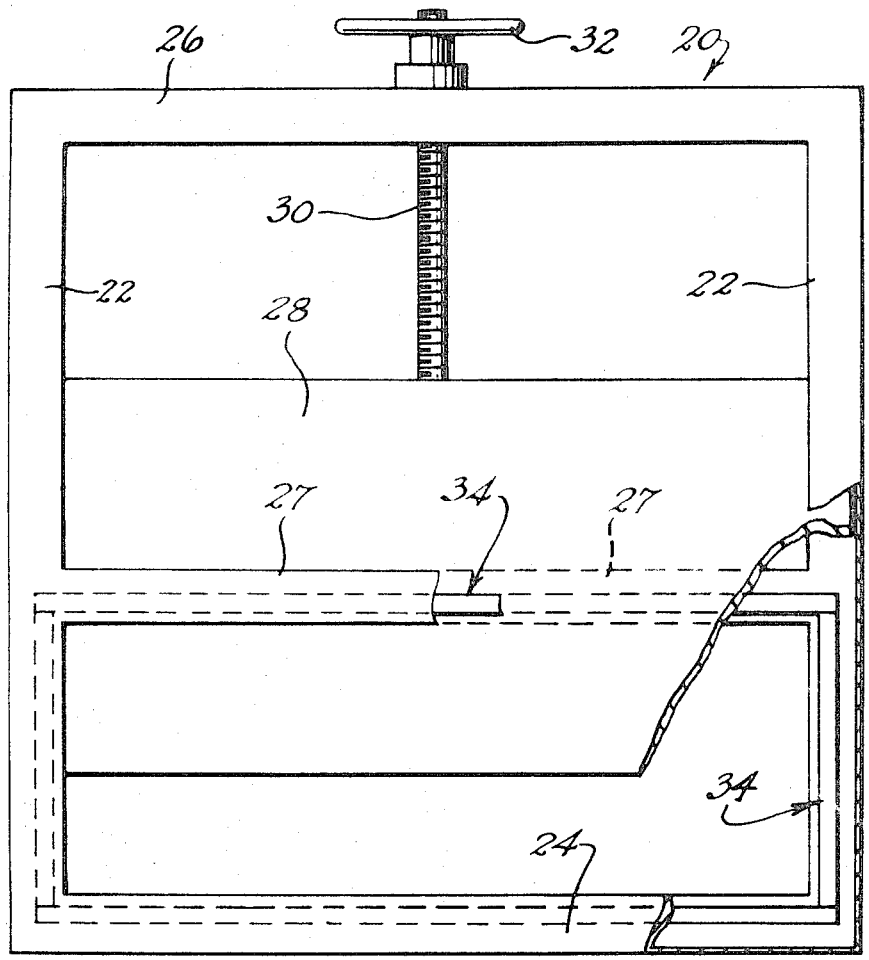
FIG. 1 is a view showing the valve in an open condition.
Figure 2:
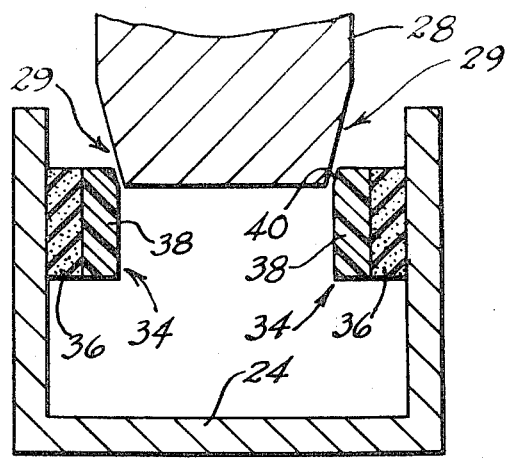
FIG. 2 is a view in section showing a lower portion of the valve with the closure member thereof nearing a closed condition.

The valve comprises a rectangular metal frame 20 comprising parallel U-shaped channel members 22 a transverse channel member 24 disposed at right angles to the members 22 and a cross member 26 parallel to the transverse member 24 connecting the members 22; channels in the channel members 22, 24 open inwardly of the frame 20. A transverse member 27 parallel with the members 24, 26 connects the members 22. The frame 20 is intended to be secured about a flow channel along which fluid, for example sewage, may flow, in sealed engagement with the walls of the channel and with the channel members 22 vertical and with the transverse member 27 above the member 24; the members 22, 24 and 27 form an opening through which fluid flowing along the channel passes when the valve is in an open condition.

A gate 28 is mounted in the frame 20 for vertical sliding movement with edge portions of the gate 28 sliding in the channels in the channel members 22. The gate 28 is rectangular and has two substantially flat parallel faces (spaced apart about two inches) and tapered lower edge portions 29; the gate may be made of any suitable material impervious to and resistant to chemical attack by the fluid which is to flow along the flow channel but is preferably a light-weight rigid plastics material, for example a closed cell rigid polyvinyl chloride foam having if necessary a suitable outer skin. A screw-threaded rod 30 is secured to an upper edge portion of the gate 28 and projects vertically upwards through a hole (not shown) in the cross member 26 and an internally threaded meshing bore (not shown) in a hand wheel 32 rotatably mounted on the cross member 26; the gate 28 may be raised or lowered to move it between the closed and open conditions by rotation of the hand wheel.

Two generally similar sealing members 34 are bonded to opposed surface portions of the frame 20 facing inwardly of the channel. Each sealing member 34 extends downwardly along a portion of one of the members 22 from the top of the gate, across the bottom along the member 24 up a portion of the other of the members 22 at the opposite side of the flow channel and along a portion of the member 27 to join with a top end portion of the sealing member 34 on said one of the members 22, thus to provide an effectively continuous sealing member about the opening in the frame. The sealing members 34 are in the form of a strip and comprise a resilient portion 36 and a flexible bearing portion 38 of approximately equal thickness, the portion 38 having a lower coefficient of friction than the portion 36, with respect to the surface portion of the gate on which it is to bear. The resilient portion 36 is of a closed cell non-absorbent plastics or rubber foam material selected according to the conditions which it must withstand in use, for example of nitrile or neoprene rubber. The bearing portion 38 is of material also selected according to the conditions it must withstand in use having a low coefficient of friction with respect to said surface portion of the gate 28 and preferably non-absorbent and wear resistant e.g. to abrasion by grit or the like, for example medium density high molecular weight polyethylene. The bearing portion 38 is bonded to the resilient portion 36 using a suitable adhesive. Where the portion 38 is polyethylene and the portion 36 is nitrile rubber an epoxy-based adhesive is suitably used to bond the portion 38 to the portion 36. The face of the portion 38 which is to be bonded to an adjacent face of the portion 36 by the cement is mechanically abraded e.g. by shot-blasting or wire-brushing, to facilitate the bonding. Also where the portion 36 is of nitrile rubber a similar epoxy-based adhesive may be used to bond it to the associated surface portion of the frame 20, the portion 36 being bonded to the frame (which may be of treated mild steel or cast iron) with the portion 38 separated from the frame by the portion 36. The bearing portions 38 of the sealing members 34 which extend along the bottom transverse member 24 of the frame 20 have chamfered upper edge portions 40 for a purpose to be described hereinafter.

The thickness of the gate 28 and the sealing members 34 and the width of the channel members are selected such that when the gate is in a closed condition with edge portions thereof between the sealing members 34 the members are compressed between adjacent surface portions of the gate 28 and the frame 20 thus effecting a fluid-tight seal between the gate 28 and the frame 20. The material of the bearing portions 38, as hereinbefore mentioned is selected so that when the gate 28 is raised it slides over the portions 38 so that neither the gate 28 nor the sealing member 34 are worn unduly by friction. The material of the bearing portions 38 is sufficiently flexible and the material of the portions 36 sufficiently resilient that minor irregularities in the surface portions of the gate and frame and slight misalignment of surface portions of the gate and frame are accommodated by flexing of the sealing members during raising and lowering of the gate and when the gate is in the closed condition irregularities are similarly accommodated thus avoiding leakage of fluid past the sealing members between said adjacent surface portions of the gate and frame. A degree of wear occurring during use of the valve in the sealing members or gate may also be compensated for by the resilience of the sealing members.

The tapered lower edge portions 29 of the gate 28 and chamfered edge portions 40 of the members 34 are arranged so that as the gate 28 is lowered and nears the closed condition the edge portions 29 and 40 facilitate introduction of the gate between the sealing members 34 on the channel member 24.

The seal provided by the sealing members of the valve will normally be effective against flow in either direction through the valve.

What is claimed is:

1. A penstock comprising a frame member having means defining an opening therethrough, a closure member slidably mounted on said frame member for movement between open positions permitting fluid flow through said opening along a predetermined path and a fully closed position blocking said fluid flow, means on one of said members on the downstream side of said opening defining a flat sealing face disposed in a plane at right angles to the flow path, a laminated seal element of uniform thickness on the other of said members adapted to be compressed between said members and extending continuously around said opening on the downstream side, said sealing face during opening and closing movements of said closure member slidably contacting said sealing member in said plane and providing a continuous uniform seal around said opening with said seal element uniformly compressed in a direction parallel to said path when the closure member is in fully closed position, and said seal element comprising a continuous portion of resilient material bonded to said other member and a continuous bearing portion having lower frictional properties than said resilient portion with respect to said face on the one member bonded to said resilient portion and having its outer surface in sliding engagement with said face.

2. A penstock according to claim 1, wherein said resilient portion and said bearing portion are of substantially equal thickness.

3. A penstock according to claim 1, wherein the resilient portion comprises a cellular elastomer.

4. A penstock according to claim 3, wherein the resilient portion is a nitrile rubber foam.

5. A penstock according to claim 1, wherein the bearing portion is abrasion resistant.

6. A penstock according to claim 1, wherein the bearing portion is polyethylene.

7. A penstock according to claim 1, wherein the part of the bearing portion of the seal element extending along the bottom of the frame below the opening has chamfered edge portions to facilitate sliding passage of the closure member.

8. A penstock according to claim 1, wherein a lower edge portion of the closure member is tampered to facilitate sliding past said seal element.

9. A penstock as defined in claim 1, wherein said closure member is a rigid non-metallic lightweight synthetic plastic member and said bearing portion of the seal element is a non-absorbent abrasion resistant synthetic plastic.

10. A penstock according to claim 1, wherein the closure member is formed from rigid polyvinylchloride closed cell foam.

11. A penstock as defined in claim 1, wherein said sealing face is on said closure member and said seal element is on the frame member.

12. A penstock as defined in claim 1, wherein said one member has a second sealing face parallel to said first named sealing face, and said other member has mounted thereon a second sealing element similar to said first named sealing element and slidably engaged by said second sealing face and compressed between said members.

13. A penstock as defined in claim 12, wherein said sealing faces are on opposite sides of said closure member, and said seal elements are mounted on frame sections disposed on opposite sides of said closure member.

* * * * *